United States Patent
Zhou et al.

(10) Patent No.: US 10,506,608 B1
(45) Date of Patent: Dec. 10, 2019

(54) SELECTIVE DISTRIBUTION OF MIMO LAYERS AMONG CARRIERS

(71) Applicant: Sprint Spectrum L.P., Overland Park, KS (US)

(72) Inventors: Yu Zhou, Herndon, VA (US); Shahzada Rasool, Vienna, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 168 days.

(21) Appl. No.: 15/437,189

(22) Filed: Feb. 20, 2017

(51) Int. Cl.
*H04W 72/04* (2009.01)
*H04B 7/0456* (2017.01)
*H04W 24/08* (2009.01)
*H04B 7/0413* (2017.01)
*H04L 12/26* (2006.01)
*H04W 72/12* (2009.01)

(52) U.S. Cl.
CPC ...... *H04W 72/0486* (2013.01); *H04B 7/0413* (2013.01); *H04L 43/0888* (2013.01); *H04W 72/1289* (2013.01)

(58) Field of Classification Search
CPC ..... H04W 24/10; H04W 48/18; H04W 28/08; H04W 36/14
See application file for complete search history.

(56) References Cited

U.S. PATENT DOCUMENTS

| 2009/0196196 A1 | 8/2009 | Ghosh et al. | |
| 2010/0329203 A1* | 12/2010 | Lee | H04L 5/0023 370/329 |
| 2011/0310932 A1* | 12/2011 | Park | H04L 5/0023 375/141 |
| 2016/0119816 A1* | 4/2016 | Yasukawa | H04W 48/20 455/453 |
| 2017/0055162 A1* | 2/2017 | Takano | H04W 16/28 |
| 2018/0027562 A1* | 1/2018 | Jeon | H04L 5/001 455/450 |
| 2018/0227885 A1* | 8/2018 | Lee | H04J 11/00 |

FOREIGN PATENT DOCUMENTS

WO 2016/122372 A1 8/2016

OTHER PUBLICATIONS

LTE, Evolved Universal Terrestrial Radio Access (E-UTRA); Physical layer procedures (3GPP TS 36.213 version 13.2.0 Release 13), p. 70-80.

* cited by examiner

Primary Examiner — Romani Ohri

(57) ABSTRACT

Disclosed are methods and systems for selecting and configuring a distribution of multiple-input multiple-output (MIMO) layers among one or more carriers. For a first candidate distribution, a base station may determine a first total throughput of communications between the base station and a user equipment device (UE). And for a second candidate distribution, the base station may determine a second total throughput of communications between the base station and the UE. Then, the base station may determine that the first total throughput is higher than the second total throughput and may responsively configure MIMO service of the UE with MIMO communication on at least two layers distributed across one or more carriers in accordance with the first distribution.

20 Claims, 7 Drawing Sheets

CONSTRAINTS:

— 26

|  | *M* | *N* | *X* | *Y* |
|---|---|---|---|---|
| UE 14 | 4 | 10 | 4 | 2 |

CANDIDATE DISTRIBUTIONS:

— 28

|  | CARRIER 1 | CARRIER 2 | CARRIER 3 | CARRIER 4 |
|---|---|---|---|---|
| # OF LAYERS ASSIGNED | 4 | 4 | 2 | 0 |

— 30

|  | CARRIER 1 | CARRIER 2 | CARRIER 3 | CARRIER 4 |
|---|---|---|---|---|
| # OF LAYERS ASSIGNED | 4 | 2 | 2 | 2 |

Fig. 2

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26/26A |
| 29 | 2 | reserved |
| 30 | 4 | |
| 31 | 6 | |

Fig. 3

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |
| 26A | 632 | 1288 | 1928 | 2600 | 3240 | 3880 | 4584 | 5160 | 5992 | 6456 |

| | CARRIER 1 | CARRIER 2 | CARRIER 3 | CARRIER 4 |
|---|---|---|---|---|
| # OF LAYERS ASSIGNED | 4 | 4 | 2 | 0 |
| BANDWIDTH (Mhz) | 20 | 20 | 10 | - |
| LOAD | 20% | 40% | 10% | - |
| CQI | 14 | 10 | 7 | - |
| $I_{MCS}$ | 25 | 18 | 12 | - |
| $N_{PRB}$ | 6 | 3 | 4 | - |
| $I_{TBS}$ | 23 | 16 | 11 | - |
| TBS PER LAYER (Bits) | 3496 | 968 | 776 | - |
| TOTAL THROUGHPUT | (3496 x 4) + (968 x 4) + (776 x 2) = 19.4 Mbps | | | |

38

| | CARRIER 1 | CARRIER 2 | CARRIER 3 | CARRIER 4 |
|---|---|---|---|---|
| # OF LAYERS ASSIGNED | 4 | 2 | 2 | 2 |
| BANDWIDTH (Mhz) | 20 | 20 | 10 | 10 |
| LOAD | 20% | 40% | 10% | 30% |
| CQI | 14 | 10 | 7 | 5 |
| $I_{MCS}$ | 25 | 18 | 12 | 8 |
| $N_{PRB}$ | 6 | 3 | 4 | 2 |
| $I_{TBS}$ | 23 | 16 | 11 | 8 |
| TBS PER LAYER (Bits) | 3496 | 968 | 776 | 248 |
| TOTAL THROUGHPUT | (3496 x 4) + (968 x 2) + (776 x 2) + (248 x 2) = 17.5 Mbps | | | |

Fig. 5

SELECTIVE DISTRIBUTION OF MIMO LAYERS AMONG CARRIERS

BACKGROUND

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol (radio access technology), with communications from the base stations to UEs defining a downlink or forward link and communications from the UEs to the base stations defining an uplink or reverse link. Examples of existing air interface protocols include, without limitation, Long Term Evolution (LTE) (using Orthogonal Frequency Division Multiple Access (OFDMA) and Single Carrier Frequency Division Multiple Access (SC-FDMA)), Code Division Multiple Access (CDMA) (e.g., 1xRTT and 1xEV-DO), Global System for Mobile Communications (GSM), IEEE 802.11 (WIFI), BLUETOOTH, among others. Each protocol may define its own procedures for registration of UEs, initiation of communications, handover between coverage areas, and other functions related to air interface communication.

In accordance with a recent version of the LTE standard of the Universal Mobile Telecommunications System (UMTS), for instance, each coverage area of a base station may operate on one or more carriers spanning 1.4 MHz, 3 MHz, 5 MHz, 10 MHz, 15 MHz, or 20 MHz, with each carrier being divided primarily into subcarriers spaced apart from each other by 15 kHz. Further, the air interface is divided over time into a continuum of 10-millisecond frames, with each frame being further divided into ten 1-millisecond subframes or transmission time intervals (TTIs) that are in turn each divided into two 0.5-millisecond segments. In each 0.5 millisecond segment or in each 1 millisecond TTI, the air interface is then considered to define a number of 12-subcarrier wide "resource blocks" spanning the frequency bandwidth (i.e., as many as would fit in the given frequency bandwidth). In addition, each resource block is divided over time into symbol segments of 67 μs each, with each symbol segment spanning the 12-subcarriers of the resource block and thus supporting transmission of symbols in "resource elements."

The LTE air interface then defines various channels made up of certain ones of these resource blocks and resource elements. For instance, on the downlink, certain resource elements across the bandwidth are reserved to define a physical downlink control channel (PDCCH) for carrying control signaling from the base station to UEs, and other resource elements are reserved to define a physical downlink shared channel (PDSCH) for carrying bearer data transmissions from the base station to UEs. Likewise, on the uplink, certain resource elements across the bandwidth are reserved to define a physical uplink control channel (PUCCH) for carrying control signaling from UEs to the base station, and other resource elements are reserved to define a physical uplink shared channel (PUSCH) for carrying bearer data transmissions from UEs to the base station.

In a system arranged as described above, when a UE enters into coverage of a base station, the UE may engage in attach signaling with the base station, by which the UE would register to be served by the base station on a particular carrier. Through the attach process and/or subsequently, the base station and supporting LTE network infrastructure may establish for the UE one or more bearers, essentially defining logical tunnels for carrying bearer data between the UE and a transport network such as the Internet.

Once attached with the base station, a UE may then operate in a "connected" mode in which the base station may schedule data communication to and from the UE on the UE's established bearer(s). In particular, when a UE has data to transmit to the base station, the UE may transmit a scheduling request to the base station, and the base station may responsively allocate one or more upcoming resource blocks on the PUSCH to carry that bearer traffic and transmit on the PDCCH to the UE a downlink control information (DCI) message that directs the UE to transmit the bearer traffic in the allocated resource blocks, and the UE may then do so. Likewise, when the base station has bearer traffic to transmit to the UE, the base station may allocate PDSCH resource blocks to carry that bearer traffic and may transmit on the PDCCH to the UE a DCI message that directs the UE to receive the bearer traffic in the allocated resource blocks, and the base station may thus transmit the bearer traffic in the allocated resource blocks to the UE. LTE also supports uplink control signaling on the PUCCH using uplink control information (UCI) messages. UCI messages can carry scheduling requests from UEs, requesting the base station to allocate PUSCH resource blocks for uplink bearer data communication.

Moreover, a revision of LTE known as LTE-Advanced now permits a base station to serve a UE with "carrier aggregation," by which a base station schedules bearer communication with the UE on multiple carriers at a time. With carrier aggregation, multiple carriers from either contiguous frequency bands or non-contiguous frequency bands can be aggregated to increase the bandwidth available to the UE. Currently, the maximum bandwidth for a data transaction between a base station and a UE using a single carrier is 20 MHz. Using carrier aggregation, a base station may increase the maximum bandwidth to up to 100 MHz by aggregating up to five carriers. Each aggregated carrier is referred to as a "component carrier."

Although serving a UE with carrier aggregation can help improve throughput for the UE, other technologies could also help improve throughput for the UE. One such technology is known as multiple-input multiple-output (MIMO) with spatial multiplexing.

In particular, MIMO provides for air interface communication concurrently on multiple different radio-frequency propagation paths, from multiple transmit-antennas at the transmitting end (e.g., at the base station or the UE) to multiple receive-antennas at the receiving end (e.g., at the UE or the base station). With spatial multiplexing, when the transmitting end has data to transmit to the receiving end on a given carrier, the data is multiplexed onto multiple antenna output ports and thus onto multiple RF propagation paths, so that a separate portion of the data is transmitted respectively on each propagation path. In practice, each propagation path is considered to be a MIMO "layer" assigned to the given carrier.

Moreover, MIMO communication service on a carrier could be characterized by how many transmit antennas (or transmit antenna groups), T, are used and how many receive antennas (or receive antenna groups), R, are used, as T×R MIMO service. Further, if T and R are equal, then the number of MIMO layers assigned to the carrier could be considered equal to T and R, whereas if T and R are different, then the number of MIMO layers assigned to the carrier could be considered the lesser of the two. Thus, for example, MIMO service on the carrier with two transmit antennas and two receive antennas (2×2 MIMO) could be considered to have two layers, MIMO service on the carrier with four transmit antennas and four receive antennas (4×4 MIMO) could be considered to have four layers, and MIMO service on the carrier with two transmit antennas and one receive antenna (2×1 MIMO) or with just one transmit antenna and one receive antenna (1×1 MIMO—still MIMO, but effectively single-input single-output (SISO)) could be considered to have just one layer. Other examples are possible as well.

When a base station serves a UE on a single carrier using MIMO with N layers, the base station could specify the MIMO configuration in the base station's DCI message to the UE when scheduling data communication to or from the UE to occur on particular air interface resources. In accordance with that MIMO specification, the base station and UE may then each make use of the indicated number of antennas for their air interface communication with each other, with the data communication being spatially multiplexed over the indicated number of layers. Thus, for communication in a given subframe, the base station could allocate particular air interface resources for communication to or from the UE and could specify use of N MIMO layers on the carrier; and all N of the MIMO layers could then share those allocated air interface resources, being distinguished from each other by at least their spatially separate RF propagation paths.

Likewise, when a base station serves a UE on a multiple carriers concurrently and uses MIMO with N layers, the base station could specify the MIMO configuration in its DCI message to the UE when scheduling data communication to or from the UE to occur on particular air interface resources respectively on each carrier. In accordance with that MIMO specification, the base station and UE may then each make use of the indicated number of antennas for their air interface communication with each other, with the data communication being spatially multiplexed over the respectively indicated number of layers on each carrier. Thus, for communication in a given subframe, the base station could allocate particular air interface resources respectively on each of the carriers. And on each respective carrier, the respectively assigned layers could share the air interface resources allocated on the carrier, being distinguished from each other by at least their spatially separate RF propagation paths.

Overview

Depending on capabilities of a UE and/or on other factors, a base station may be able to serve the UE on up to M carriers and using a total of N layers distributed among the carrier(s) on which the base station serves the UE. In practice, many layer distributions are possible, with each distribution including assignment of at least two of the N layers. Moreover, each distribution may include layer assignments to one or more of the M carriers, such that at least one layer is assigned to each of those one or more carriers.

By way of example, assuming that M=3 and N=6, a first distribution may assign two layers respectively to each carrier of the three carriers, a second distribution may assign three layers respectively to each of two carriers and none to the remaining carrier, and a third distribution may assign just four of the layers to just one of the carriers, thereby leaving the remaining layers and carriers unused. Other examples are also possible.

Given that a plurality of layer distributions are possible, at issue then is which distribution a base station should use when serving the UE. To resolve this issue, the present disclosure introduces an approach for comparing two or more candidate distributions and for selecting one of those candidate distributions based on the comparison.

According to the disclosed approach, the base station may determine candidate distributions based on one or more constraints, such as based on the maximum number of carriers on which the base station can serve the UE, among others. For each such candidate distribution, the base station may respectively predict or otherwise determine a total throughput of communications between the base station and the UE on carrier(s) that have layer assignments according to that distribution. Then, the base station may select the distribution predicted/determined to provide for the highest total throughout of communications, and may responsively configure MIMO service for the UE with MIMO communication on layers distributed among carrier(s) in accordance with the selected distribution. In this manner, the base station may effectively maximize the total throughput given the constraints.

As such, in one respect, disclosed is a method of controlling communication over an air interface between a base station and a UE. The base station may be configured to serve the UE on up to M carriers, where M≥1. Also, the base station may be configured to provide the UE with carrier aggregation service over the air interface using two or more carriers. Further, the base station may be configured to serve the UE over the air interface using MIMO service defining N layers of communication, where N≥2. Yet further, the base station may be able to distribute layers among one or more carriers according to a plurality of distributions, with each distribution of the plurality distributing at least two of the N layers among one or more of the M carriers such that at least one layer is respectively assigned to each of the one or more carriers.

In accordance with the method, for a first distribution of the plurality, the base station may determine a first total throughput of communications between the base station and the UE. And for a second distribution of the plurality, the base station may determine a second total throughput of communications between the base station and the UE. Then, the base station may determine that the first total throughput is higher than the second total throughput, and may responsively configure MIMO service of the UE with MIMO communication on at least two of the N layers distributed among one or more of the M carriers according to the first distribution.

In another respect, disclosed is a wireless communication system. The system may include a base station that has an antenna structure configured to provide an air interface through which the base station serves one or more UEs. The base station may be configured to serve a UE on up to M carriers, where M≥1. Also, the base station may be configured to provide the UE with carrier aggregation service over the air interface using two or more carriers. Further, the base station may be configured to serve the UE over the air interface using MIMO service defining N layers of communication, where N≥2. Yet further, the base station may be able to distribute layers among one or more carriers according to a plurality of distributions, with each distribution of the plurality distributing at least two of the N layers among one or more of the M carriers such that at least one layer is respectively assigned to each of the one or more carriers.

Furthermore, the system may include controller, which may be part of or separate from the base station. The controller may be configured to carry out the following operations: (i) for a first distribution of the plurality, determining a first total throughput of communications between the base station and the UE, (ii) for a second distribution of the plurality, determining a second total throughput of communications between the base station and the UE, (iii) making a determination that the first total throughput is higher than the second total throughput, and (iv) in response to making the determination, configuring the MIMO service of the UE with MIMO communication on at least two of the N layers distributed among one or more of the M carriers in accordance with the first distribution.

Still further, in yet another respect, disclosed is a non-transitory computer-readable medium having stored thereon instructions executable by a processor to selectively distribute MIMO layers among carriers.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

BRIEF DESCRIPTION OF THE DRAWINGS

FIG. 2 illustrates constraints based on which a base station determines candidate MIMO layer distributions, in accordance with an example embodiment.

FIG. 3 illustrates a mapping table reproduced from an LTE standard.

FIG. 4 illustrates another mapping table reproduced from an LTE standard.

FIG. 5 illustrates throughputs respectively determined for candidate MIMO layer distributions, in accordance with an example embodiment.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
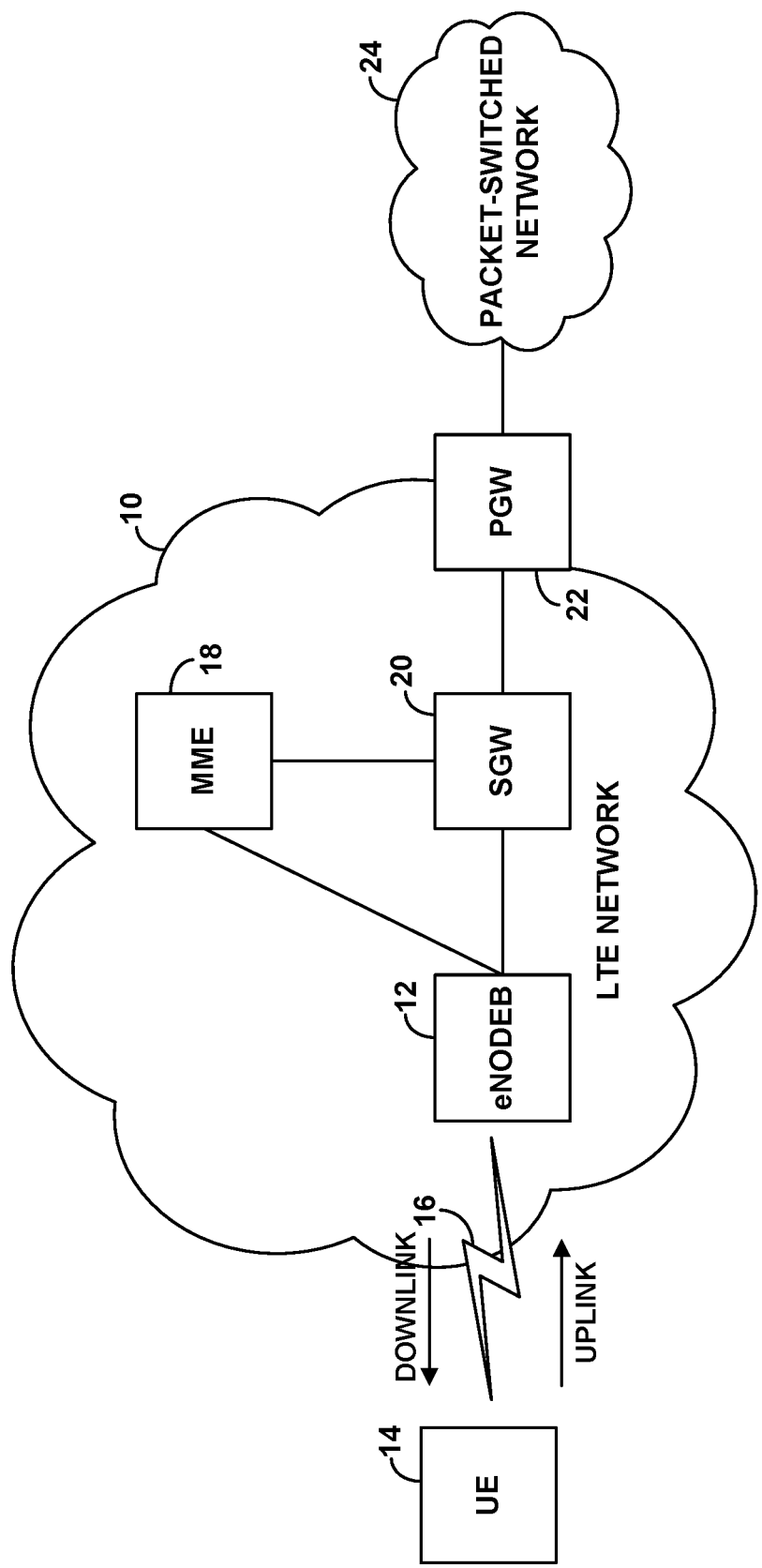
FIG. 1 is a simplified block diagram of a wireless communication system in which the present method can be implemented.

Referring to the drawings, FIG. 1 is a simplified block diagram of a wireless communication system in which the present method can be implemented. In particular, FIG. 1 depicts a representative LTE network 10, which functions primarily to serve UEs with wireless packet data communication service, including possibly voice over Internet Protocol (VoIP) service, but may also provide other functions. As shown, the LTE network 10 includes at least one example LTE macro base station 12 known as an eNodeB, which has an antenna structure and associated equipment for providing an LTE coverage area in which to serve one or more UEs, such as an example UE 14 as shown. More specifically, the eNodeB 12 radiates to define a wireless air interface 16 through which the eNodeB 12 may communicate with the served UE 14 via the downlink and the uplink.

As shown in FIG. 1, the eNodeB 12 has a communication interface with a Mobility Management Entity (MME) 18. The MME 18 can function as a signaling controller for the LTE network 10. Further, the eNodeB 12 has a communication interface with a serving gateway (SGW) 20, which in turn has a communication interface with a packet-data network gateway (PGW) 22 that provides connectivity with a packet-switched network 24, and the MME 18 has a communication interface with the SGW 20. In particular, the eNodeB 12 may be communicatively linked with a core network, which may be operated by a wireless service provider. The core network then provides connectivity with one or more MMES, such as MME 18, as well as one or more gateways such as SGW 20 and PGW 22.

In line with the discussion above, an eNodeB and a UE may be configured (e.g., licensed and programmed) to support air interface communication on various particular carriers. Each such carrier may be identified by one or more globally unique identifiers per industry standard, so that the eNodeB and a served UE can refer to particular carriers by those identifiers.

With this arrangement, when the UE enters into coverage of the eNodeB, the UE may detect the eNodeB's coverage on a particular carrier, and the UE and eNodeB may engage in an attach process or handover process to register with the LTE network on that carrier, configuring service of the UE by the eNodeB on that carrier. For instance, the UE may initially transmit an access request message on the carrier to the eNodeB, and the UE and eNodeB may then engage in signaling in accordance with a Radio Resource Control (RRC) protocol to establish a radio-link-layer connection (RRC connection) on which the UE and eNodeB can engage in further communication. In turn, the UE may then transmit to the eNodeB via the RRC connection an attach request seeking to register with the LTE network and be served by the eNodeB, and the eNodeB may pass the attach request along to the MME for processing.

After authenticating the UE, the MME may then engage in signaling with the eNodeB and SGW to establish for the UE one or more logical bearer connections, or bearers, between the UE and the PGW. Each such bearer may include a radio bearer portion over the air between the UE and the eNodeB, and a service bearer or access bearer portion between the eNodeB and the PGW via the SGW. Further, the eNodeB may store a context record for the UE, indicating service state and parameters for serving the UE, such as an identification of the carrier on which the eNodeB is serving the UE. And the UE may likewise store a context record indicating its service state and parameters for being served, such as the carrier on which it is being served.

With service of the UE so configured, the eNodeB could then serve the UE with data communications over the air interface. In accordance with LTE, for example, data is modulated into symbols using a data modulation and coding scheme (MCS) and symbols are then modulated onto the air interface using an air interface modulation scheme.

In practice, the eNodeB could select an MCS based on channel quality so as to have each symbol represent more or fewer bits of data depending on channel quality. By way of example, the UE may from time to time determine its channel quality based on downlink transmissions (e.g., downlink reference signal strength) and perhaps one or more other factors (e.g., UE's capabilities), and the UE may from time to time transmit to the eNodeB a channel state information (CSI) report. The CSI report may include channel quality information (CQI) that indicates the UE's determined channel quality, a pre-coding matrix indicator (PMI) that indicates preferred weights to be applied during pre-coding to help optimize signal-to-interference-plus-noise-ratio (SINR), and/or a rank indicator (RI) that indicates a preferred transmission mode, among other possibilities. The eNodeB may then use at least some of the information in the reported CSI as basis for selecting an MCS. For instance, using a standard CQI-MCS mapping table that maps CQI to MCS, the eNodeB may determine from the reported CQI what MCS to use for communication with the UE.

With this arrangement, as the data for the UE arrives at the eNodeB, the eNodeB may schedule and provide transmission of the data to the UE. In particular, the eNodeB could determine an appropriate MCS based on the UE's reported channel quality, and the eNodeB could thereby determine how many resource elements and thus how many downlink resource blocks would be required to transmit the data. The eNodeB could then assign certain downlink resource block(s) in a TTI to carry at least a portion of the data to the UE. And in that TTI, the eNodeB could transmit to the UE a DCI message specifying the MCS and assigned resource block(s) and could transmit the data accordingly in the specified resource block(s), using air interface modulation.

Likewise, as the UE has data to transmit on the network, the UE could transmit a scheduling request to the eNodeB in a particular TTI and could provide the eNodeB with a report of the quantity of data to be transmitted. The eNodeB could then similarly determine an appropriate MCS based on the UE's reported channel quality and determine how many resource elements and thus how many uplink resource blocks would be required to transmit the data. The eNodeB could then assign certain uplink resource block(s) in an upcoming TTI to carry at least a portion of the data from the UE and could transmit to the UE a DCI specifying the MCS and assigned resource block(s) of the upcoming TTI. In that upcoming TTI, the UE could then transmit data accordingly in the specified resource block(s), using air interface modulation.

Moreover, given that the eNodeB could serve numerous UEs concurrently on a carrier and that the carrier has limited bandwidth in each TTI, the eNodeB could apply a scheduling process to allocate resources of the carrier as appropriate among its served UEs. Thus, through this scheduling process, the eNodeB may consider bandwidth of the carrier as well as load on the carrier as further basis for determining the number of resource blocks to allocate to the UE at issue during a particular TTI. Other considerations are possible as well.

Further in line with the discussion above, at the time of attachment or otherwise while serving the UE, the eNodeB could also configure service of the UE to be on a certain number of carriers. For instance, once the UE has attached on a single carrier, the eNodeB could add one or more carriers to the UE's service so as to then provide the UE with carrier aggregation service. Also, when the eNodeB is serving the UE on multiple carriers concurrently, the eNodeB could add one or more additional carriers, swap carriers, or remove one or more carriers, possibly reverting to serving the UE on just a single carrier. To so reconfigure the UE's service, the eNodeB could generate and transmit to the UE an RRC connection reconfiguration message identifying the carrier(s) on which the eNodeB will serve the UE, and the eNodeB and UE could update their context records accordingly, so that they would be prepared to communicate with each other on the identified carrier(s).

When the eNodeB thereby provides the UE with carrier aggregation service, the eNodeB may similarly coordinate data communication to and from the UE, but with the communication occurring on the multiple carriers concurrently. As the eNodeB receives data destined to the UE, the eNodeB may schedule transmission of that data on particular PDSCH resources respectively of each carrier, the eNodeB may transmit on the PDCCH to the UE a DCI message specifying the allocated resources per carrier, and the eNodeB may transmit the data to the UE on the specified resources concurrently on the multiple carriers, for receipt by the UE. And likewise, when the eNodeB receives from the UE a scheduling request indicating that the UE has data to transmit, the eNodeB may allocate particular PUSCH resources respectively on each carrier, the eNodeB may transmit on the PDCCH to the UE a DCI message specifying the allocated PUSCH resources per carrier, and the UE may then transmit the data on the specified resources concurrently on the multiple carriers, for receipt by the eNodeB and forwarding to the SGW.

As further noted above, the eNodeB and the UE could also support MIMO communication defining multiple concurrent layers of data communication, optimally with spatial multiplexing to help distinguish the layers from each other. To facilitate this, the eNodeB and the UE could each be equipped with multiple separate antennas (or antenna systems, arrays, groups, or the like) arranged or configurable to engage in RF communication on separate respective propagation paths, in a well-known manner. For transmitting signals using MIMO, the eNodeB and the UE could each be equipped with a multiplexer for separating a signal into a number of distinctly encoded independent data streams, one for each antenna. For receiving signals using MIMO, the eNodeB and the UE could be each equipped with a decoder for combining the received data streams into the original signal. As such, the data streams can be concurrently transmitted by multiple antennas at the transmitting end and concurrently received by multiple antennas at the receiving end.

By concurrently communicating a signal over multiple layers of communication, the use of MIMO allows the signal to be communicated at a higher throughput, with more layers corresponding to a higher throughput. In practice, the number of layers supported by the eNodeB and UE could depend on their respective antenna configurations, with the maximum number of supported layers on a carrier being equivalent to the smaller of the number of transmitting antennas and the number of receiving antennas being used. To facilitate scheduling communication on an appropriate number of MIMO layers, the eNodeB could learn the UE's layer capability through a UE-capability report provided during attachment or the like, or from a network-based capabilities-record for the UE (e.g., UE context record).

When the eNodeB schedules data communication to or from a UE on allocated air interface resources, the eNodeB could configure MIMO communication of the data. To do so, the eNodeB could include in its DCI message to the UE an indication of the number of communication layers on a given carrier, such as by including in a precoding field of the DCI message a bit pattern that maps to the number of layers to be used. With a MIMO configuration where T=R, the number of layers specified could be a number that equals T and R, so that a specification of 2 layers could represent 2×2 MIMO, a specification of 4 layers could represent 4×4 MIMO, and a specification of 8 layers could represent 8×8 MIMO, and so forth. Further, more particular indications could be provided for other MIMO configurations, such as to indicate a MIMO configuration where T and R differ from each other.

With some variation possible, multiple MIMO layers could share the allocated air interface resources on a carrier. For instance, if the eNodeB allocates ten resource blocks on a carrier and designates two-layer MIMO communication, two separate MIMO layers of data could be transmitted concurrently on the resources of each of those ten resource blocks, optimally with the two layers being differentiated from each other by their spatial multiplexing. Likewise, if the eNodeB allocates ten resource blocks respectively on each of two carriers, for a total of twenty resource blocks, and the eNodeB designates four-layer MIMO communication per carrier, four MIMO layers of data could be transmitted per carrier. And on each respective carrier, those four MIMO layers of data could be transmitted concurrently on each of the resources of those respective ten resource blocks, again optimally with the layers being differentiated from each other by at least their spatially separate RF propagation paths.

As indicated above, depending on capabilities of a UE and/or on other factors, an eNodeB may be able to serve the UE on up to M carriers (M≥1) and using a total of N MIMO layers (N≥2). In this regard, as noted, the eNodeB may distribute at least two of the N layers among the carrier(s) on which the eNodeB serves the UE. Although a plurality of layer distributions may be possible, each distribution generally distributes at least two of the N layers among one or more of the M carriers such that at least one layer is respectively assigned to each of the one or more carriers.

To help resolve the question of which distribution an eNodeB should use when serving the UE, the present disclosure introduces an approach for the eNodeB to select a distribution to use. In practice, the eNodeB could carry out the disclosed approach in the context of selecting from among three or more candidate distributions, perhaps also using an optimization (e.g., convex optimization) tool to facilitate the determination of which distribution to use. For simplicity, however, the disclosed approach is often described herein in the context of comparing two candidate distributions and then selecting one of those candidate distributions. Moreover, the eNodeB may carry out the disclosed approach when establishing service for the UE and/or from time-to-time while serving the UE, among other options.

In accordance with the present disclosure, the eNodeB may determine candidate distributions based on certain constraint(s), and for each distribution, the eNodeB may predict or otherwise determine a total throughput of communications between the eNodeB and the UE on carrier(s) that have layers assigned thereto according to that distribution. After the eNodeB predicts or otherwise determines the total throughputs, the eNodeB may then select the distribution predicted/determined to provide for the highest total throughout of communication between the eNodeB and the UE. Once selected, the eNodeB may responsively configure MIMO service for the UE with MIMO communication on layers distributed among carrier(s) in accordance with the selected distribution.

More specifically, to facilitate selection of a distribution, the eNodeB may initially determine constraint(s) related to the served UE's MIMO and carrier aggregation services. In practice, the eNodeB may determine constraint(s) based on information stored in the UE's context record and/or based on a UE-capability report provided by the UE, among other possibilities.

In one example, the determined constraint(s) may include the UE's carrier aggregation capabilities, which may indicate whether or not the UE can engage in carrier aggregation service as a general matter and, if the UE can engage in carrier aggregation service, the maximum quantity M of carriers that the eNodeB can include in the carrier aggregation service of the UE. In another example, the determined constraint(s) may include the UE's layer capabilities. Generally, the layer capabilities may define the maximum quantity N of layers that the eNodeB can include in the MIMO service of the UE, the maximum quantity X of layers that the eNodeB can assign to a given carrier in the carrier aggregation service of the UE, and/or the maximum quantity Y of carriers in the carrier aggregation service of the UE to which the eNodeB can respectively assign X layers, among other options. Other examples are also possible.

Once the eNodeB determines the constraint(s), the eNodeB may then use those determined constraint(s) as basis for determining candidate distributions.

In one case, the eNodeB may do so by solving function(s) that output candidate distributions when variable(s) of those function(s) are constrained by the constraint(s) at issue. In practice, the function(s) could take on one of various forms dependent on engineering design and on the constraint(s) being considered. Also, the eNodeB could be configured with those function(s) via manual engineering input.

In another case, the eNodeB may determine a plurality of distributions as a general matter without considering any constraint(s), and may then identify candidate distributions of the plurality that meet the determined constraint(s). For instance, when evaluating a particular distribution of the plurality, the eNodeB may determine whether or not the particular distribution includes a total quantity of layers that is less than or equal to the maximum quantity N of layers. The eNodeB may then similarly evaluate the particular distribution with regards to other constraints (e.g., M, X, and Y). And if the eNodeB determines that the particular distribution meets all constraint(s), the eNodeB may responsively determine that the particular distribution is a candidate distribution that the eNodeB could use when serving the UE. Other cases are possible as well FIG. 2 next illustrates example constraints 26 as well as candidate distributions 28 and 30 that the eNodeB 12 could determine based on those constraints 26. According to the illustrated constraints 26, the eNodeB 12 can include a maximum of four (M) carriers in the carrier aggregation service of the UE 14. Also, the eNodeB 12 can include a maximum of ten (N) layers in the MIMO service of the UE 14. Further, the eNodeB 12 can assign a maximum of four (X) layers to a given carrier in the carrier aggregation service of the UE 14. Yet further, the eNodeB 12 can respectively assign that maximum of four (X) layers to up to a maximum of two (Y) carriers in the carrier aggregation service of the UE 14. As such, given these constraints 26, the eNodeB 12 then determines two candidate distributions 28 and 30.

As shown, candidate distribution 28 includes four layers assigned to a first carrier, four layers assigned to a second carrier, two layers assigned to a third carrier, and no layers assigned to a fourth carrier. In this way, the candidate distribution 28 meets the defined constraints 26. Specifically, the candidate distribution 28 ensures that the total quantity of carriers being used (i.e., three) is less than or equal to the maximum permitted quantity (M) of four, that the total quantity of layers being assigned (i.e., ten) is less than or equal to the maximum permitted quantity (N) of ten, that the maximum quantity of layers assigned to a given carrier (i.e., four) is less than or equal to the permitted quantity (X) of four, and that the maximum number of carriers that each respectively have X layers assigned thereto (i.e., two) is less than or equal to the permitted quantity (Y) of two.

Furthermore, candidate distribution 30 includes four layers assigned to the first carrier, two layers assigned to the second carrier, two layers assigned to the third carrier, and two layers assigned to the fourth carrier. In this way, the candidate distribution 30 meets the defined constraints 26. Specifically, the candidate distribution 30 ensures that the total quantity of carriers being used (i.e., four) is less than or equal to the maximum permitted quantity (M) of four, that the total quantity of layers being assigned (i.e., ten) is less than or equal to the maximum permitted quantity (N) of ten, that the maximum quantity of layers assigned to a given carrier (i.e., four) is less than or equal to the permitted quantity (X) of four, and that the maximum number of carriers that each respectively have X layers assigned thereto (i.e., one) is less than or equal to the permitted quantity (Y) of two. Other illustrations are possible as well.

Once the eNodeB determines two or more candidate distributions, the eNodeB may then predict or otherwise determine the total throughput respectively for each candidate distribution. As noted, for each distribution, the eNodeB may respectively predict or otherwise determine a total throughput of communications between the eNodeB and the UE on carrier(s) that have layers assigned thereto according to that distribution. For instance, if a first distribution distributes layers among three carriers, then the eNodeB may predict or otherwise determine a total throughput of communications between the eNodeB and the UE on those three carriers. And if a second distribution distributes layers among four carriers, then the eNodeB may predict or otherwise determine a total throughput of communications between the eNodeB and the UE on those four carriers. Other instances are also possible.

Moreover, when determining a total throughput for a given one of the candidate distributions, the eNodeB may respectively determine throughput for each carrier in the distribution. And the eNodeB may then determine the total throughput to be a sum of the respective throughputs. Generally, the eNodeB may use one of various techniques to determine throughput on a carrier. Thus, although an example technique is described herein, other techniques are possible as well without departing from the scope of the present disclosure.

In the example technique, to facilitate prediction/determination of throughput on a respective carrier, the eNodeB may initially determine several factors related to that respective carrier. In particular, the eNodeB may determine channel condition(s) on the respective carrier, bandwidth of the respective carrier, load on the respective carrier, and/or the quantity of layers to be assigned to the respective carrier according to the distribution being evaluated, among other options. In an example implementation, the channel condition(s) may be those specified in the most recently reported CSI. Also, the eNodeB may determine the bandwidth based on a stored mapping of the respective carrier's globally unique identifier to the respective carrier's bandwidth and/or in may do so in other ways. Moreover, the load on the carrier may be the load on the carrier in one or more most recent TTIs or may be a load that the eNodeB predicts the respective carrier to exhibit in a future TTI (e.g., based on quantity of data to be scheduled for transmission on the carrier in that future TTI). Other implementations are also possible.

Given these and/or other factors, the eNodeB may then predict/determine throughput on the respective carrier. For instance, the eNodeB may determine an MCS to use on the respective carrier for communications with the UE, and the eNodeB may do so based on channel condition(s) in line with the discussion above (e.g., based on a standard CQI-MCS mapping table). Additionally, the eNodeB may determine a number of resource blocks to assign to the UE on the carrier, and the eNodeB may do so based on the bandwidth, load, and/or selected MCS as discussed above.

Once the eNodeB determines the MCS and the number of assigned resource blocks, the eNodeB may then use look-up tables to determine a transport block size (TBS) for a single layer of communication. In particular, the eNodeB may maintain a look-up table that maps an MCS index ("$I_{MCS}$") to a TBS index ("$I_{TBS}$"). Additionally, the eNodeB may maintain a look-up table that maps the combination of $I_{TBS}$ and number of assigned resource block ("$N_{PRB}$") to a value of the TBS, which defines how many bits the eNodeB can transmit on the assigned resource blocks in a TTI using a single layer. Generally, these look-up tables may be based on tables found in LTE industry standards. For example, FIG. 3 illustrates an $I_{MCS}$ to $I_{TBS}$ mapping table 32 reproduced from the standard "3GPP TS 36.213 V13.2.0" (release version 13). In another example, FIG. 4 illustrates an $I_{TBS}$/$N_{PRB}$ to TBS mapping table 34 also reproduced from the standard "3GPP TS 36.213 V13.2.0" (release version 13). As such, the eNodeB may use maintained look-up tables to determine the TBS for a single layer of communication.

After the eNodeB determines the TBS for a single layer of communication, the eNodeB may then predict/determine throughput on the respective carrier. Specifically, given that the distribution may assign more than one MIMO layer to a carrier, the eNodeB may multiply the determined TBS by the number of layers assigned to the respective carrier according to the distribution being evaluated. In practice, the outcome of that multiplication may then provide the throughput value on the respective carrier in terms number of bits per second. Depending on engineering design, the eNodeB could also convert that throughput value to another throughput value specifying the number of megabytes per second (Mbps), among other options.

In this manner, the eNodeB could facilitate determination/prediction of throughput respectively for each carrier in a given distribution, and could then determine the total throughput to be a sum of the respective throughputs. In turn, once the eNodeB predicts/determines the total throughput respectively for each candidate distribution, the eNodeB may then compare the determined total throughputs and may select the distribution that is thereby predicted/determined to provide for the highest total throughout of communication between the eNodeB and the UE.

Responsive to selecting a distribution, the eNodeB may then configure MIMO service for the UE with MIMO communication on layers distributed among carrier(s) in accordance with the selected distribution. To do so, the eNodeB may update the UE's context record to indicate use of the selected distribution for data communications between the eNodeB and the UE. In this way, the eNodeB can then transmit DCI(s) in line with the discussion above, so as to assign the appropriate number of layers on each carrier in accordance with the selected distribution. Moreover, assuming that the selected distribution distributes layers among multiple carriers, the eNodeB may also configure carrier aggregation service for the UE to include each carrier that has at least one layer assigned thereto according to the selected distribution.

FIG. 5 next illustrates a table 36 representative of a throughput determination for the candidate distribution 28 in line with the technique described herein as well as a table 38 representative of a throughput determination for the candidate distribution 30 also in line with the technique described herein. As shown, the eNodeB 12 may predict a throughput of 19.4 Mbps for candidate distribution 28 and a throughput of 17.5 Mbps for candidate distribution 30. Thus, given that the candidate distribution 28 may provide for a higher throughput than candidate distribution 30, the eNodeB 12 may select the distribution 28 and may configure MIMO service for the UE 14 with MIMO communication on layers distributed among carriers in accordance with the selected distribution 28. Other illustrations are possible as well.

Figure 6:
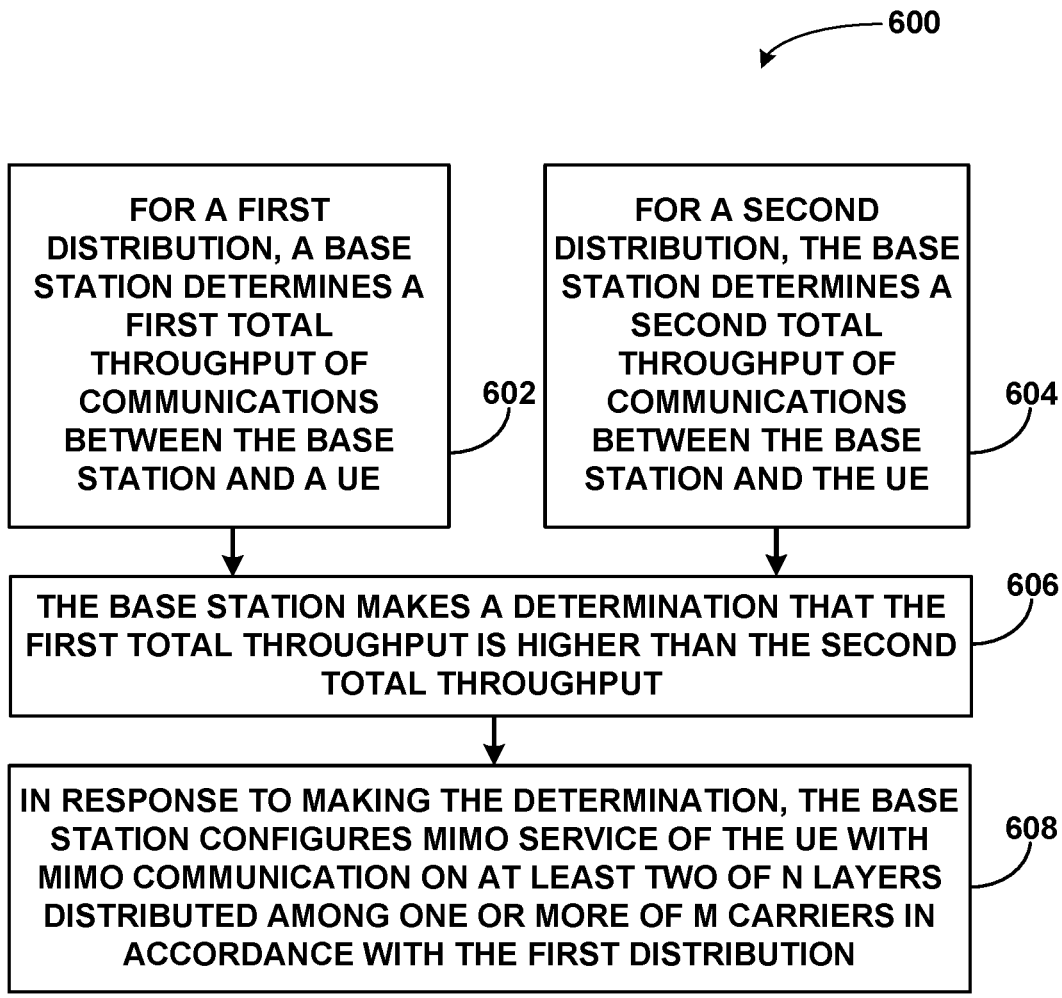
FIG. 6 is a flowchart illustrating a method to facilitate selection of a MIMO layer distribution, in accordance with an example embodiment.

FIG. 6 is next a flow chart illustrating a method 600 according to an example embodiment. Illustrative methods, such as method 600, may be carried out in whole or in part by component(s) and/or arrangement(s) in a wireless communication system, such as by one or more of the components of the example communication system shown in FIG. 1 and/or by one or more of the components of the example base station shown in FIG. 7 and further discussed below, among other possibilities. However, it should be understood that example methods, such as method 600, may be carried out by other entities or combinations of entities as well as in other arrangements, without departing from the scope of the disclosure.

In particular, method 600 is a method of controlling communication over an air interface between a base station and UE. The base station is configured to serve the UE on up to M carriers, where M≥1. Also, the base station is configured to provide the UE with carrier aggregation service over the air interface using two or more carriers. Further, the base station is configured to serve the UE over the air interface using MIMO service defining N layers of communication, where N≥2. Moreover, the base station can distribute layers among one or more carriers according to a plurality of distributions. Each distribution of the plurality distributes at least two of the N layers among one or more of the M carriers such that at least one layer is respectively assigned to each of the one or more carriers.

As shown by block 602 in FIG. 6, method 600 involves, for a first distribution of the plurality, the base station determining a first total throughput of communications between the base station and the UE. Additionally, at block 604, method 600 involves, for a second distribution of the plurality, the base station determining a second total throughput of communications between the base station and the UE. Further, at block 606, method 600 involves, the base station making a determination that the first total throughput is higher than the second total throughput. Yet further, at block 608, method 600 involves, in response to making the determination, the base station configuring the MIMO service of the UE with MIMO communication on at least two of the N layers distributed among one or more of the M carriers in accordance with the first distribution.

Figure 7:
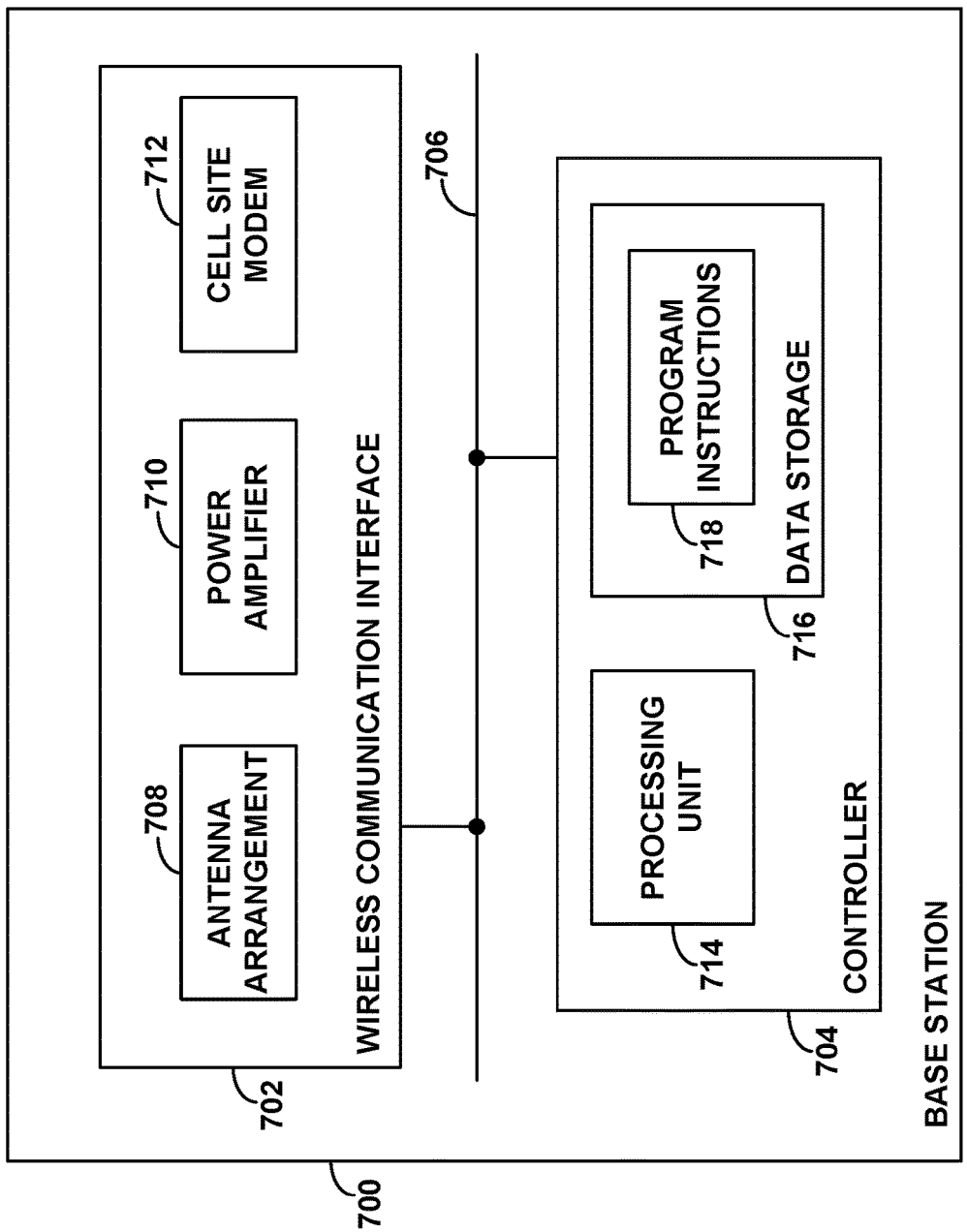
FIG. 7 is a simplified block diagram of a base station in which the present method can be implemented.

Finally, FIG. 7 is a simplified block diagram of a representative base station 700 such as eNodeB, illustrating some of the components that can be included in such an entity. As shown in FIG. 7, the representative base station 700 may include a wireless communication interface 702 and a controller 704. Additionally, these components of the base station 700 may be communicatively linked together by a system bus, network, or other connection mechanism 706. Alternatively, they may be integrated together in various ways.

As shown, wireless communication interface 702 may include an antenna arrangement 708, which may be tower mounted, and associated components such as a power amplifier 710 and a cell site modem 712 for engaging in air interface communication with UEs via the antenna arrangement 708, so as to transmit data and control information to the UEs and receive data and control information from the UEs. Additionally, controller 704 may include processing unit 714 and data storage 716 and is arranged to manage or carry out various functions such as those discussed herein.

Processing unit 714 may then comprise one or more general purpose processors (e.g., microprocessors) and/or special-purpose processors (e.g., digital signal processors and/or application specific integrated circuits) and may be integrated in whole or in part with the wireless communication interface 702. And data storage 716 may include one or more volatile and/or non-volatile storage components, such as magnetic, optical, flash, or other types of non-transitory computer readable media, and may be integrated in whole or in part with processing unit 714.

As shown, data storage 716 may hold (e.g., have encoded thereon) program instructions 718, which may be executable by processing unit 714 to carry out various controller functions, such as by carrying out one or more of the operations described herein. As such, the processing unit 714 programmed with instructions 718 may define part or all of a controller for controlling operation of the base station 700. Alternatively or additionally, however, such control functionality could be provided external to the base station 700, in another entity (e.g., separate from the base station 700) such as by a base station control entity (e.g., MME), which may be communicatively linked with the base station 700 and may serve to control certain aspects of base station operation generally.

Exemplary embodiments have been described above. It should be understood, however, that variations from these embodiments are possible, while remaining within the true spirit and scope of the invention.

We claim:

1. A method of controlling communication over an air interface between a base station and a user equipment device (UE), wherein the base station is configured to serve the UE on up to M carriers, wherein M≥1, wherein the base station is configured to provide the UE with carrier aggregation service over the air interface using two or more carriers, wherein the base station is configured to serve the UE over the air interface using multiple-input multiple-output (MIMO) service defining N layers of communication, wherein N≥2, wherein the base station can distribute layers according to a plurality of distributions, wherein each distribution of the plurality distributes two or more select layers among one or more select carriers such that at least one layer, of the two or more select layers, is respectively assigned to each of the one or more select carriers, wherein each of the two or more select layers is from among the N layers, and wherein each of the one or more select carriers is from among the M carriers, the method comprising:

for a first distribution of the plurality, determining, by the base station, a first total throughput of communications between the base station and the UE;

for a second distribution of the plurality, determining, by the base station, a second total throughput of communications between the base station and the UE;

making a determination, by the base station, that the first total throughput is higher than the second total throughput; and in response to making the determination, configuring, by the base station, the MIMO service of the UE with MIMO communication on at least two of the N layers distributed among one or more of the M carriers in accordance with the first distribution.

2. The method of claim 1, wherein the first distribution is a first candidate distribution, and wherein the second distribution is a second candidate distribution, the method further comprising:

determining, by the base station, one or more of the following constraints: (i) a maximum quantity N of layers that the base station can include in the MIMO service of the UE, (ii) a maximum quantity M of carriers that the base station can include in the carrier aggregation service of the UE, (iii) a maximum quantity X of layers that the base station can assign to a given carrier in the carrier aggregation service of the UE, and (iv) a maximum quantity Y of carriers in the carrier aggregation service of the UE to which the base station can respectively assign X layers; and based at least on the one or more determined constraints, determining, by the base station, the first and second candidate distributions.

3. The method of claim 1, wherein determining the first total throughput comprises:

for each respective carrier having at least one layer assigned thereto according to the first distribution, determining a respective throughput of communications between the base station and the UE on the respective carrier; and determining the first total throughput to be a sum of the respective throughputs.

4. The method of claim 3, wherein determining the respective throughput comprises:

determining one or more of the following factors: (i) channel condition on the respective carrier, (ii) bandwidth of the respective carrier, (iii) load on the respective carrier, and (iv) quantity of layers to be assigned to the respective carrier according to the first distribution; and determining the respective throughput based at least on the one or more determined factors.

5. The method of claim 1, wherein configuring the MIMO service comprises:

transmitting to the UE over the air interface a scheduling directive specifying the use of the first distribution for a data communication between the base station and the UE; and in accordance with the scheduling directive, engaging in the data communication using the first distribution.

6. The method of claim 5, wherein the scheduling directive is a Downlink Control Information (DCI) message.

7. The method of claim 1, wherein configuring the MIMO service comprises:

updating a UE context record to indicate use of the first distribution for data communications between the base station and the UE.

8. The method of claim 1, further comprising:

in response to determining that the first total throughput is higher than the second total throughput, configuring, by the base station, the carrier aggregation service of the UE to include each carrier that has at least one layer assigned thereto according to the first distribution.

9. The method of claim 8, wherein configuring the carrier aggregation service comprises:

transmitting to the UE a radio-resource-control (RRC) connection reconfiguration message that specifies the carriers included in the carrier aggregation service of the UE.

10. The method of claim 8, wherein configuring the carrier aggregation service comprises:

updating a UE context record to indicate the carriers included in the carrier aggregation service of the UE.

11. A wireless communication system comprising:

a base station including an antenna structure configured to provide an air interface through which the base station serves one or more user equipment devices (UEs), wherein the base station is configured to serve a UE on up to M carriers, wherein M≥1, wherein the base station is configured to provide the UE with carrier aggregation service over the air interface using two or more carriers, wherein the base station is configured to serve the UE over the air interface using multiple-input multiple-output (MIMO) service defining N layers of communication, wherein N≥2, wherein the base station can distribute layers according to a plurality of distributions, wherein each distribution of the plurality distributes two or more select layers among one or more select carriers such that at least one layer, of the two or more select layers, is respectively assigned to each of the one or more select carriers, wherein each of the two or more select layers is from among the N layers, and wherein each of the one or more select carriers is from among the M carriers; and a controller configured to carry out operations including:

for a first distribution of the plurality, determining a first total throughput of communications between the base station and the UE;

for a second distribution of the plurality, determining a second total throughput of communications between the base station and the UE;

making a determination that the first total throughput is higher than the second total throughput; and in response to making the determination, configuring the MIMO service of the UE with MIMO communication on at least two of the N layers distributed among one or more of the M carriers in accordance with the first distribution.

12. The wireless communication system of claim 11, wherein the first distribution is a first candidate distribution, wherein the second distribution is a second candidate distribution, and wherein the controller is further configured to carry out operations including:

determining one or more of the following constraints: (i) a maximum quantity N of layers that the base station can include in the MIMO service of the UE, (ii) a maximum quantity M of carriers that the base station can include in the carrier aggregation service of the UE, (iii) a maximum quantity X of layers that the base station can assign to a given carrier in the carrier aggregation service of the UE, and (iv) a maximum quantity Y of carriers in the carrier aggregation service of the UE to which the base station can respectively assign X layers; and based at least on the one or more determined constraints, determining the first and second candidate distributions.

13. The wireless communication system of claim 11, wherein determining the first total throughput comprises:

for each respective carrier having at least one layer assigned thereto according to the first distribution, determining a respective throughput of communications between the base station and the UE on the respective carrier; and determining the first total throughput to be a sum of the respective throughputs.

14. The wireless communication system of claim 13, wherein determining the respective throughput comprises:

determining one or more of the following factors: (i) channel condition on the respective carrier, (ii) bandwidth of the respective carrier, (iii) load on the respective carrier, and (iv) quantity of layers to be assigned to the respective carrier according to the first distribution; and determining the respective throughput based at least on the one or more determined factors.

15. The wireless communication system of claim 11, wherein configuring the MIMO service comprises:

transmitting to the UE over the air interface a scheduling directive specifying the use of the first distribution for a data communication between the base station and the UE; and in accordance with the scheduling directive, engaging in the data communication using the first distribution.

16. The wireless communication system of claim 11, wherein configuring the MIMO service comprises:

updating a UE context record to indicate use of the first distribution for data communications between the base station and the UE.

17. The wireless communication system of claim 11, wherein the controller is further configured to carry out operations including:

in response to determining that the first total throughput is higher than the second total throughput, configuring the carrier aggregation service of the UE to include each carrier that has at least one layer assigned thereto according to the first distribution.

18. A non-transitory computer readable medium having stored thereon instructions executable by a processor to cause a base station to perform operations, wherein the base station is configured to provide an air interface through which the base station serves one or more user equipment devices (UEs), wherein the base station is configured to serve a UE on up to M carriers, wherein M≥1, wherein the base station is configured to provide the UE with carrier aggregation service over the air interface using two or more carriers, wherein the base station is configured to serve the UE over the air interface using multiple-input multiple-output (MIMO) service defining N layers of communication, wherein N≥2, wherein the base station can distribute layers according to a plurality of distributions, wherein each distribution of the plurality distributes two or more select layers among one or more select carriers such that at least one layer, of the two or more select layers, is respectively assigned to each of the one or more select carriers, wherein each of the two or more select layers is from among the N layers, and wherein each of the one or more select carriers is from among the M carriers, the operations comprising:

for a first distribution of the plurality, determining a first total throughput of communications between the base station and the UE;

for a second distribution of the plurality, determining a second total throughput of communications between the base station and the UE;

making a determination that the first total throughput is higher than the second total throughput; and in response to making the determination, configuring the MIMO service of the UE with MIMO communication on at least two of the N layers distributed among one or more of the M carriers in accordance with the first distribution.

19. The non-transitory computer readable medium of claim 18, wherein determining the first total throughput comprises:

for each respective carrier having at least one layer assigned thereto according to the first distribution, determining a respective throughput of communications between the base station and the UE on the respective carrier; and determining the first total throughput to be a sum of the respective throughputs.

20. The non-transitory computer readable medium of claim 19, wherein determining the respective throughput comprises:

determining one or more of the following factors: (i) channel condition on the respective carrier, (ii) bandwidth of the respective carrier, (iii) load on the respective carrier, and (iv) quantity of layers to be assigned to the respective carrier according to the first distribution; and determining the respective throughput based at least on the one or more determined factors.

* * * * *